March 4, 1930. R. KOVACS 1,749,104
URINAL FOR AUTOMOBILES AND OTHER VEHICLES
Filed July 15, 1929 3 Sheets-Sheet 1
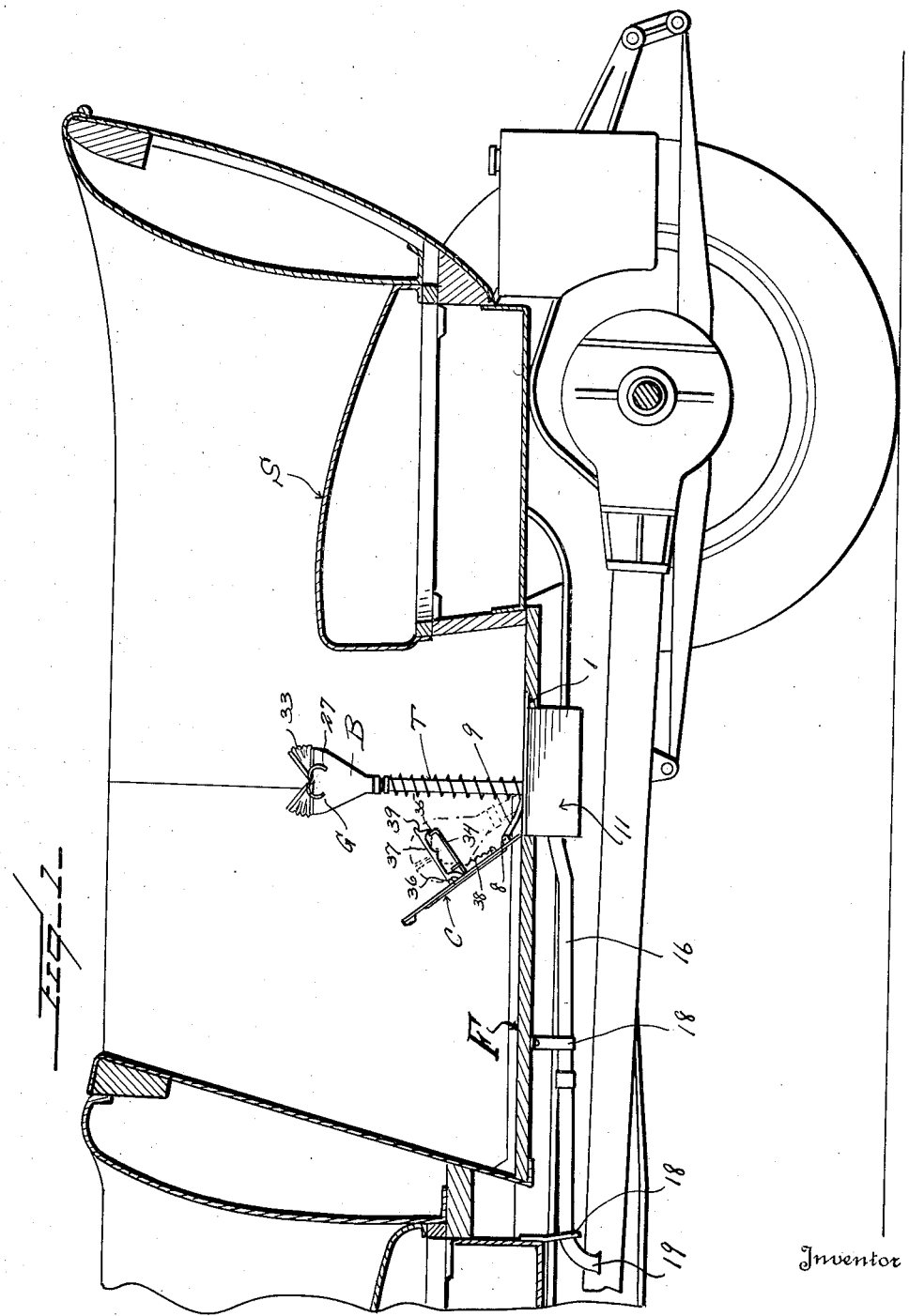

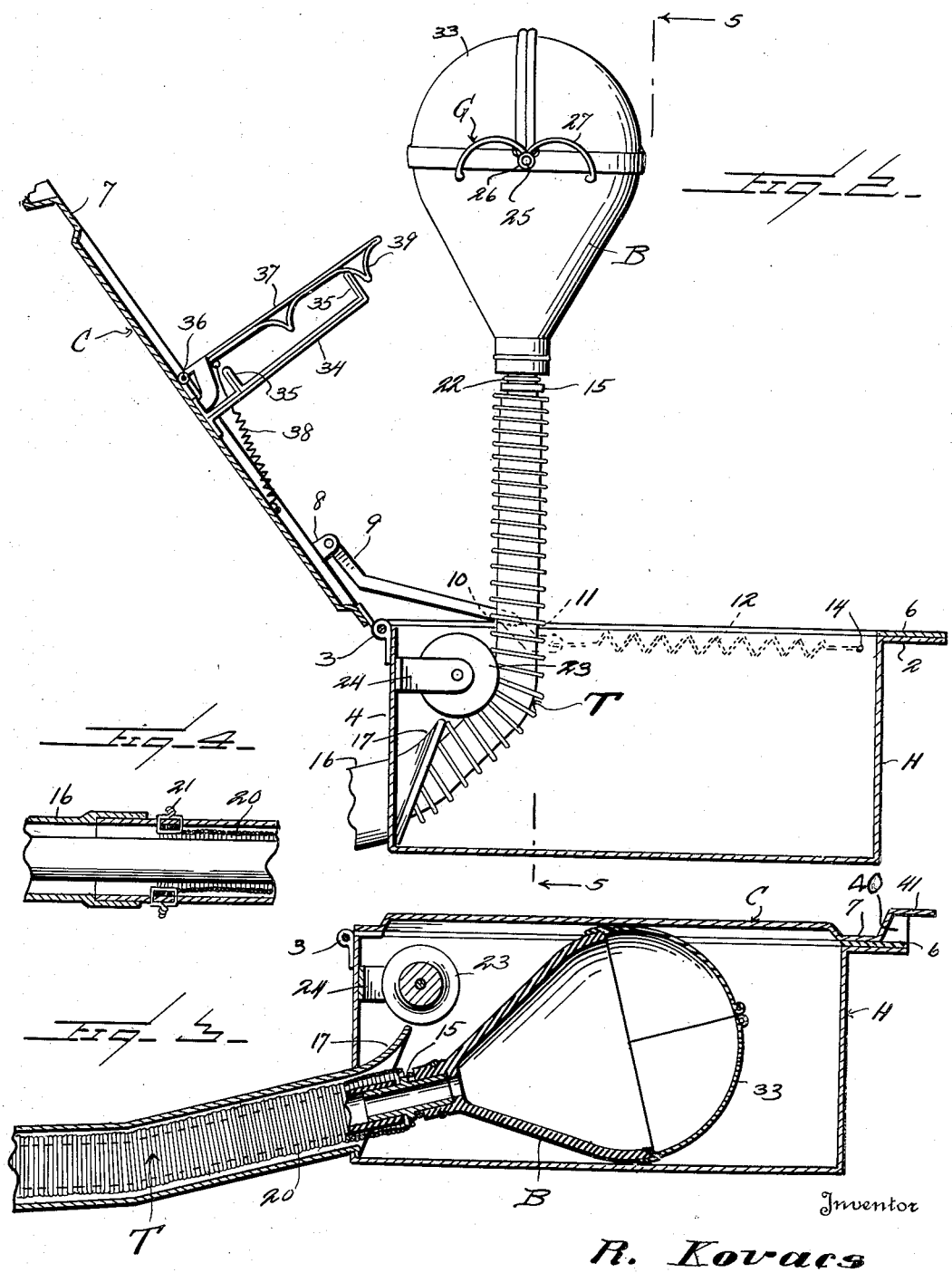

March 4, 1930.  R. KOVACS  1,749,104
URINAL FOR AUTOMOBILES AND OTHER VEHICLES
Filed July 15, 1929  3 Sheets-Sheet 3
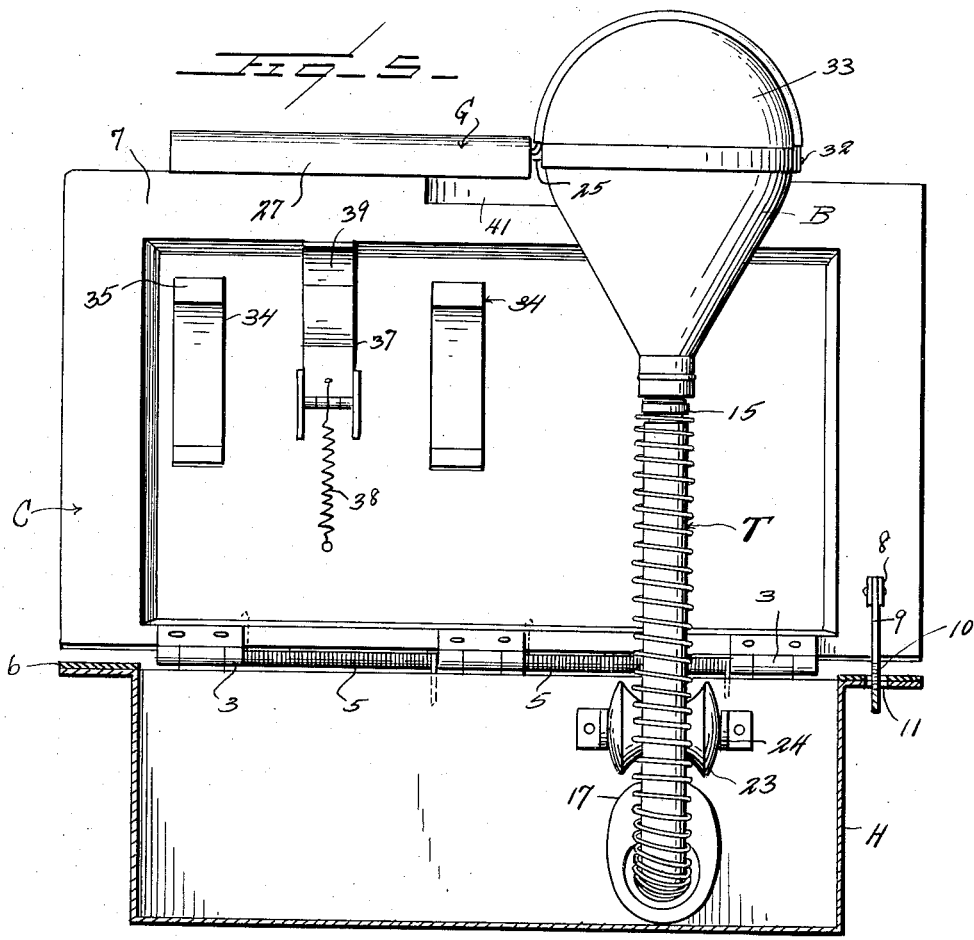
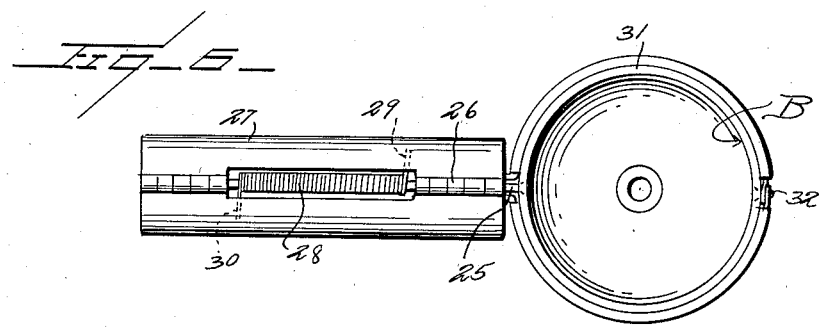
Inventor
R. Kovacs
By Watson E. Coleman
Attorney Patented Mar. 4, 1930

1,749,104

UNITED STATES PATENT OFFICE

RUDOLPH KOVACS, OF DETROIT, MICHIGAN

URINAL FOR AUTOMOBILES AND OTHER VEHICLES

Application filed July 15, 1929. Serial No. 378,443.

This invention relates to urinals for automobiles and other vehicles, and it is an object of the invention to provide a device of this kind which when not in use is substantially concealed within the structure of the vehicle proper yet when required can be readily and conveniently manipulated to meet the various requirements without the necessity of a person leaving the vehicle.
It is also an object of the invention to provide a device of this kind embodying features that makes it equally convenient for either of the sexes and which also embodies means whereby the device discharges exteriorly of the vehicle or more particularly the body.
Furthermore, it is an object of the invention to provide a device of this kind comprising a housing or box supported in desired position by the floor of the car body and which has associated therewith a normally closed lid together with a basin which is adapted to be confined within the housing when not in use and which basin has leading therefrom an eduction tube discharging exteriorly of the housing and of the car body.
An additional object of the invention is to provide an apparatus of this kind wherein the basin is provided with an eduction tube leading therefrom and which tube is supported in a manner to permit the same to freely have endwise movement and with which tube is associated a retractile medium, such as a coil spring, for automatically urging the tube in one direction and thereby facilitating the desired maintenance of the basin within the housing.
The invention also contemplates for an object to provide an apparatus of this kind including a basin having an eduction tube leading therefrom and wherein said tube and basin are so mounted as to permit the basin to be readily and conveniently carried to different portions of the car body as may be required without interference with the efficiency of the tube.
The invention consists in the details of construction and in the combination and arrangement of the several parts of my improved urinal for automobiles and other vehicles whereby certain important advantages are attained and the device rendered simpler, less expensive and otherwise more convenient and advantageous for use, as will be hereinafter more fully set forth.
The novel features of my invention will hereinafter be definitely claimed.
In order that my invention may be the better understood, I will now proceed to describe the same with reference to the accompanying drawings, wherein:—
Figure 1 is a fragmentary view partly in section and partly in elevation illustrating a urinal constructed in accordance with an embodiment of my invention and in applied position, the lid for the housing being raised;
Figure 2 is an enlarged fragmentary view partly in section and partly in elevation illustrating the housing with its lid raised together with the basin and a portion of its eduction tube;
Figure 3 is a fragmentary view in section taken through the housing with the lid closed and the basin confined therein;
Figure 4 is a fragmentary sectional view illustrating the means as herein embodied for anchoring to the eduction tube an end portion of the retractile member or spring coacting therewith;
Figure 5 is a sectional view taken substantially on the line 5—5 of Figure 2 looking in the direction of the arrow;
Figure 6 is a view in top plan of the basin.
As disclosed in the accompanying drawings, F denotes the floor of an automobile body and which at a suitable point in advance of a seat structure S is provided with an opening 1 through which is inserted from above a housing H. This housing H is of desired dimensions and has its upper edges provided with the outstanding flanges 2 in contact with the upper surface of the floor to provide means whereby suitable securing elements may be employed for effectively maintaining the housing H in desired applied or working position.
The top of the housing H is open but is adapted to be normally closed by the cover plate C. This plate C has one marginal portion hingedly connected, as at 3, with the upper marginal portion of the side wall 4 of the housing H remote from the seat structure S so that when the cover plate C is raised it has upward swinging movement in a direction away from the seat structure so that no hinderance or obstruction will be offered thereby to the proper manipulation of the basin B to be hereinafter more particularly referred to. In the present embodiment of my invention, the various hinges 3 have associated therewith a common pintle 3' and coacting with such pintle 3' and encircling the same are the springs 5, the tension of which serving to normally maintain the cover C in closed position with respect to the housing H.

The upper surfaces of the flanges 2 of the housing H have suitably applied thereto the gaskets 6 of felt or other desired material with which directly contact the depending beads 7 carried by the marginal portions of the cover C. This arrangement is employed to effectively protect the interior of the housing H against ingress of dust or other foreign matter.

The hinged marginal portion of the cover C to one side thereof is provided with a bracket 8 extending from the inner face thereof and with which is pivotally connected an end portion of an angular rigid arm 9. The formation of the arm 9 provides the outer end portion thereof with an inclined shoulder 10 which is adapted to have contact with an end edge of a slot 11 provided in a flange 2 of the housing H and through which the outer or free end portion of the arm 9 is directed from above. This contact of the inclined shoulder 10 serves to maintain the cover C in full open position, as illustrated in Figure 2 of the accompanying drawings, yet permits the cover to readily return to its closed position as a result of slight strain or stress upon the cover C.

The free end portion of the arm 9 has connected thereto an extremity of an elongated coil spring 12, the opposite end portion of which being anchored, as at 14, to a side wall of the housing H. This spring 12 serves to maintain the outer end portion of the arm 9 sufficiently raised when the cover C is in its full open position to maintain the desired butting contact of the shoulder 10. The spring, however, is of such tension as to readily yield when the cover C is returning to its closed position and for which reason, as is believed to be obvious, this spring 12 is of less tension than the tension of the springs 5 hereinbefore referred to.

The basin B is preferably of rubber molded into the required fixed formation which, as herein embodied, is in simulation of an inverted cone. An eduction tube T is in communication with the basin B at the smaller end thereof, said tube being coupled, as at 15, to the basin B in any manner which fully complies with the necessary requirements.

The tube T is of rubber or other suitable flexible material and is of material length. This tube T passes out from within the housing H through an elongated rigid tube 16. As is particularly illustrated in the accompanying drawings, the tube 16 extends a slight distance within the housing H through a side wall thereof whereby the housing constitutes a support for such end portion of the tube 16. It is also to be noted that the portion of the tube 16 within the housing H is flared, as at 17, so that as the tube T is withdrawn or retracted with respect to the tube 16 the liability of wear and tear upon the tube T is substantially eliminated. The tube 16 may be disposed in any desired direction with respect to the car body but in the present instance and as illustrated in Figure 1, it is forwardly disposed and is supported at predetermined points therealong by the brackets 18 carried by the car body. The outer or free end portion 19 of this tube 16 is downwardly disposed as illustrated in Figure 1 to facilitate the desired discharge of the matter carried off through the tube T. It is also to be understood that under normal conditions, that is to say, when the basin B is confined within the housing H, the tube T terminates inwardly of the outer end of the tube 16.

With the cover C in open position the basin B may be readily adjusted as required by the user as by exerting pull either upon the basin B or the adjacent portion of the tube T, said tube will be withdrawn or outwardly moved with respect to the tube 16 a considerable distance so that the basin may be conveniently employed by a person occupying any portion of the seat structure.

When the basin B is returned within the housing H the extended portion of the tube T is automatically retracted or returned back into the tube 16 by a retractile spring 20 of desired tension. This spring 20, as herein disclosed, is of a coiled type encircling the outer end portion of the tube T or that portion of the tube T adjacent to the basin B. One end portion of the spring 20 is connected, as at 21, to the wall of the tube 16 at a desired distance spaced from the housing H while the opposite end portion of the spring is suitably anchored, as at 22, to the connection or coupling 15 between the tube T and the basin B.

Immediately above the flared portion 17 of the tube 16 within the housing H is supported a flanged pulley 23 of desired dimensions and with which, as illustrated in Figure 2, the tube T contacts from below as the basin B is withdrawn from within the housing H. This is of advantage as it provides a means to avoid breaking of the tube T and also materially increases the facility with which the basin B may be carried to the locations desired. In the present embodiment of my invention, the pulley 23 is rotatably supported by a bracket 24 secured to and extending inwardly of the housing H from the wall 4 hereinbefore referred to.

While I have illustrated in the accompanying drawings my improved urinal as positioned for use by the occupants of the rear seat, it is to be understood that a second device can be employed for use by the occupants of the front seat structure. However, as these two devices are similar it is believed that a detailed illustration and description of one is sufficient for the purposes of disclosure.

The larger or bell end of the basin B is open and associated with said open end portion of the basin is a hand grasp G. In the present embodiment of my invention this hand grasp G comprises an elongated rod 25 with which, as particularly illustrated in Figure 6, are hingedly connected, as at 26, the oppositely disposed elongated curved plates 27, said plates being normally maintained at their limit of separating movement by a coil spring 28, one extremity 29 of which underlying one plate 27 and the opposite extremity 30 underlying the second plate. The inner end portions of the plates 27 are provided with the arcuate arms 31 encircling the bell or open end portion of the basin B with their outer end portions pivotally connected one to the other by the pintle 32 which is carried by the adjacent portion of the basin B. By this means as the plates 27 are swung one toward the other a similar swinging movement will be imparted to the arms 31. As particularly illustrated in Figure 6, the arms 31 are each substantially in the form of a semi-circle.

Secured to the arcuate arms 31 are the marginal portions of the rubber or kindred readily flexible sheets of material 33 which are also securely fastened to the marginal portions of the bell or enlarged end of the basin B.

With the plates 27 in their normal spaced relation the arcuate arms 31 are in raised position so that the bell or outer open end of the basin B is effectively closed. However, by suitable pressure exerted by the hand engaging the hand grasp G the arms 31 will be swung downwardly or in a direction one toward the other to effect the desired opening of the larger or bell end of the basin B. It is to be understood that these arms 31 will be separated when the device is in use in accordance with the requirements of practice and particularly as may be necessitated by the sex.

While I herein particularly describe and illustrate a closure for the larger or bell end of the basin B, it is to be understood that if desired the same may be omitted.

Extending outwardly from the inner face of the cover C is a pair of parallel rigid bracket arms 34, each of which being provided with longitudinally spaced shoulders 35. When the basin B is not in use the hand grasp G is adapted to be placed upon these bracket arms 34 between the shoulders 35.

At a point slightly above the plane of the parallel bracket arms 34 there is hinged, as at 36, to the inner face of the cover C an elongated holding arm 37. This arm 37 is positioned substantially midway between the bracket arms 34 and, as herein disclosed, is constantly urged in a direction toward the plane of the parallel arms 34 by the retractile member 38, herein disclosed as a coil spring, having one end portion suitably secured to the holding arm 37 and its opposite end portion secured at a desired point to the cover C.

When the hand grasp G is placed upon the bracket arms 34 the contact of the holding arm 37 thereon will result in the basin B being effectively held to and carried by the cover C. This supporting of the basin B by the cover C is also one which eliminates rattling when the vehicle is in transit.

As is clearly illustrated in the drawings, this holding arm 37 is provided with the depending shoulders 39 for effective engagement with the hand grasp G and the hinged connection 36 for this holding arm 37 permits the same to be readily and conveniently adjusted into a position to permit the basin B to be withdrawn when desired.

The rigid tube 16 hereinbefore referred to need not be of one piece from end to end but is preferably formed in sections as illustrated in Figure 4 thereby readily facilitating the proper connections at 21 of an end portion of the spring 20 with said tube 16.

The outer free marginal portion of the cover C at its central part is provided with a notch or recess 40 which is arranged inwardly of a lifting flange or lip 41 carried by said cover C. By this means the cover C may be readily and conveniently raised.

While I have stated that the holding arm 37 serves to hold the basin B against vibration when the same is in operative engagement with the bracket arms 34, it is also to be understood that the action of the spring 20 hereinbefore referred to also serves as an effective means to offset any tendency of vibration of the basin as such spring provides an additional means to pull or hold the hand grasp G in close and firm contact with the bracket arms 34.

From the foregoing description it is thought to be obvious that a urinal for an automobile or other vehicle constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A urinal apparatus for automobiles comprising a housing adapted to be installed in the floor of said automobile, a hinged cover therefor, a basin provided with a hand grasp, said basin and hand grasp being adapted to be confined within the housing when the cover is closed, means for detachably engaging the hand grasp to hold the urinal to the cover, and an eduction tube leading from the basin and extending exteriorly of the housing.

2. A urinal apparatus for automobiles comprising a housing adapted to be installed in the floor of said automobile, a hinged cover therefor, a basin provided with a hand grasp, said basin and hand grasp being adapted to be confined within the housing when the cover is closed, means for detachably engaging the hand grasp to hold the urinal to the cover, an eduction tube leading from the basin and extending exteriorly of the housing, releasable means for holding the cover at the limit of its open position, and automatic means for returning the cover to its closed position upon release of such holding means.

3. A urinal apparatus for automobiles comprising a housing adapted to be installed in the floor of said automobile, a hinged cover therefor, a basin provided with a hand grasp, said basin and hand grasp being adapted to be confined within the housing when the cover is closed, means for detachably engaging the hand grasp to hold the urinal to the cover, an eduction tube leading from the basin and extending exteriorly of the housing, a rigid tube leading from and in communication with the housing, the tube leading from the basin being flexible and being disposed within the rigid tube, and a coil spring encircling the flexible tube, one extremity of the spring being secured to the flexible tube and the opposite extremity to the rigid tube to provide means for automatically retracting the flexible tube within the rigid tube when the basin is returned within the housing.

4. A urinal apparatus for automobiles comprising a housing adapted to be installed in the floor of said automobile, a hinged cover therefor, a basin provided with a hand grasp, said basin and hand grasp being adapted to be confined within the housing when the cover is closed, means for detachably engaging the hand grasp to hold the urinal to the cover, an eduction tube leading from the basin and extending exteriorly of the housing, curved rods pivotally supported at opposite sides of the outer end of the basin, flexible sheets connected to said rods and to the adjacent end portion of the basin for closing the basin when the rods are at the limit of their movement one toward the other, and means for separating said rods.

5. A urinal apparatus for automobiles comprising a housing adapted to be installed in the floor of said automobile, a hinged cover therefor, a basin provided with a hand grasp, said basin and hand grasp being adapted to be confined within the housing when the cover is closed, means for detachably engaging the hand grasp to hold the urinal to the cover, an eduction tube leading from the basin and extending exteriorly of the housing, curved rods pivotally supported at opposite sides of the outer end of the basin, flexible sheets connected to said rods and to the adjacent end portion of the basin for closing the basin when the rods are at the limit of their movement one toward the other, means for separating said rods, and automatic means for normally maintaining the rods at the limit of their movement one toward the other.

In testimony whereof I hereunto affix my signature.

RUDOLPH KOVACS.